United States Patent [19]
Spinello

[11] 3,826,005
[45] July 30, 1974

[54] DENTAL MIRROR APPARATUS FOR HOLDING EXPENDABLE DEMISTING SLEEVES

[76] Inventor: Ronald P. Spinello, 372 Post Ave., Westbury, N.Y. 11590

[22] Filed: Mar. 23, 1973

[21] Appl. No.: 344,271

[52] U.S. Cl. .................................................. 32/69
[51] Int. Cl. ............................................. A61c 3/00
[58] Field of Search ...................... 32/66, 69; 128/10

[56] References Cited
UNITED STATES PATENTS

| | | | |
|---|---|---|---|
| 1,695,451 | 12/1928 | Campbell | 32/69 |
| 2,834,109 | 5/1958 | O'Hara | 32/69 |
| 3,566,474 | 3/1971 | Zuhlke et al. | 32/69 |

*Primary Examiner*—Robert Peshock
*Attorney, Agent, or Firm*—Eisenman, Allsopp & Strack

[57] ABSTRACT

There is disclosed a dental mirror assembly which is adapted to receive and securely position expendable demisting sleeves which are adapted to be slid downwardly over the handle to a point of contact with the mirror surface. The narrow stem portion by means of which the mirror head is attached to the thicker handle portion, has attached thereto a sleeve-deforming member which projects radially outwardly from the stem to distort the surrounding sleeve into an oval configuration for frictionally securing the sleeve against both rotation and sliding movement.

6 Claims, 7 Drawing Figures

PATENTED JUL 30 1974   3,826,005

3,826,005

DENTAL MIRROR APPARATUS FOR HOLDING EXPENDABLE DEMISTING SLEEVES

BACKGROUND OF THE INVENTION

In the applicant's copending application Ser. No. 251,452, filed May 8, 1972, there is disclosed, among other embodiments, a demisting sleeve carrying a surfactant material and which is adapted to be slid down over the handle and stem to the dental mirror to engage the mirror surface at its edge. Because dental mirror handles come in a variety of sizes, it is not possible to achieve a demisting sleeve diameter which is universally effective. If the internal diameter is too small, the sleeves can not be positioned and, if the diameter is too large, the sleeves in some cases are so loose that contact with the mirror is lost, particularly after an interval of dental operating procedures in the presence of water spray.

Accordingly, it is an object of the present invention to provide a structure such as a universal adapter for securing demisting sleeves frictionally in position against unauthorized movement.

SUMMARY OF THE INVENTION

In accordance with the invention, the narrow stem of the dental mirror which extends upwardly at an angle from the mirror head, and which is attached coaxially to a thicker handle portion, carries a radially offset sleeve-deforming portion, which distorts the sleeve into an oval configuration at a point between the handle and the mirror head. The sleeve-distorting portion can be formed integrally with the stem or it can comprise a detachable member, such as a convexly curved spring finger, which can be detachably coupled thereto. In another embodiment, a collar frictionally grips the stem portion and carries the sleeve-deforming member, preferably extending outwardly from the stem on the upper side thereof, with the sleeve-deforming portion being resiliently deformable to better accommodate the sleeve.

PREFERRED EMBODIMENTS OF THE INVENTION

Figure 1:
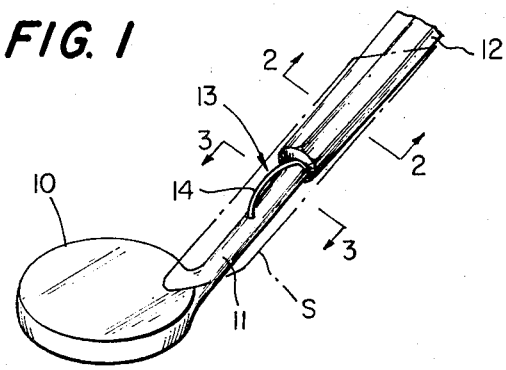
FIG. 1 is a view in perspective of a dental mirror assembly having a deforming member for a demisting sleeve, the latter shown in phantom lines.
Figure 1A:
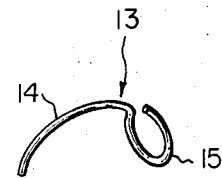
FIG. 1A is a view in perspective of the sleeve-deforming member separated from the dental mirror.

Referring to FIG. 1, there is shown in side view a dental mirror having a reflecting head portion 10 and extending upwardly at an angle therefrom a narrow support stem 11 attached to an aligned and substantially thicker handle portion 12. Slipped over the handle portion and downwardly over the stem portion 11 to engage the edge of the reflecting head 10 is a demisting sleeve S (shown in phantom lines) of a type shown and described in detail in the applicant's copending application Ser. No. 251,452, filed May 8, 1972. Because radial clearance between the sleeve S and the thickened handle portion 12 is generally desirable to facilitate ease of mounting, and also to enable one sleeve size to be used universally with dental mirrors having slightly different handle diameters, the sleeve is normally under such conditions loosely positioned. It can, for example, under such circumstances, lose contact with the mirror surface and diminish its effectiveness.

In order to hold the sleeve S in position, a sleeve-deforming member 13 is attached to the mirror assembly. The sleeve-deforming member 13 includes a convexly curving spring finger 14 overlying the upper surface of the stem 11 and extending radially outwardly therefrom for a distance beyond the radial extremity of the handle portion 12. The spring finger 14 is adapted to be detachably secured to the stem 11 by means of a collar 15 which is adapted to be clamped between the threaded coupling (not shown) between the outer end of the stem 11 and the lower end of the handle 12.

Figure 2:
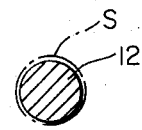
FIG. 2 is a view in cross-section taken on the line 2—2 of FIG. 1 looking in the direction of the arrows.
Figure 3:
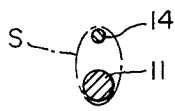
FIG. 3 is a view in cross-section taken on the line 3—3 of FIG. 1 looking in the direction of the arrows.

Referring to FIG. 2, the cross-section of the sleeve and handle near the upper end of the sleeve S shows the generally concentric configuration between the sleeve and handle. FIG. 3 shows the cross-sectional configuration and the line 3—3 at the point of maximum radial displacement of the deforming finger 14, and shows the sleeve S deformed into an oval configuration which frictionally secures it against both rotation and axial displacement.

Figure 4:
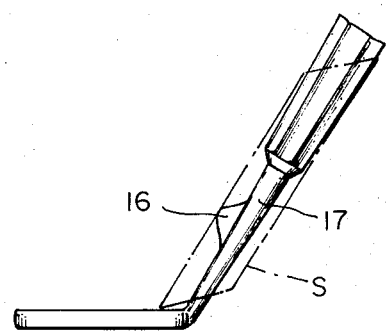
FIG. 4 is a side view of a dental mirror showing another embodiment of the invention.

Referring to FIG. 4, the invention is shown as embodied in an integrally formed, radial extension 16 on the stem portion 17 of a dental mirror assembly. The contoured radially extending portion 16 functions in generally the same way as the resilient sleeve-deforming member 14 of FIG. 1.

Figure 5:
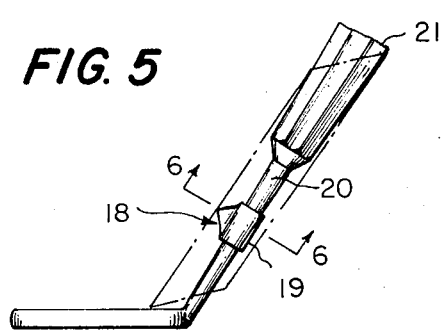
FIG. 5 is a side view of a dental mirror assembly showing another embodiment of the invention.
Figure 6:
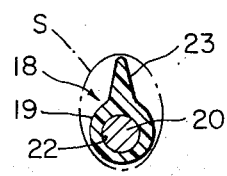
FIG. 6 is a view in cross-section taken on the line 6—6 of FIG. 5 looking in the direction of the arrows.

Referring to FIG. 5, there is illustrated another embodiment of the invention in which a detachable member 18 formed, for example, of silicon rubber, includes a cylindrical collar portion 19 adapted to be slipped over the stem portion 20 of the dental mirror when the handle portion 21 is detached. The collar portion 19 includes a central through-bore 22 which is of slightly smaller diameter than the stem 20 but which is capable of stretching by virtue of its resilience in order to frictionally grip the stem. A sleeve-deforming portion 23 is formed integrally with the collar 19 and projects radially outwardly therefrom to deform the sleeve.

While the invention has been disclosed above having reference to preferred embodiments thereof, it will be understood that it can take other forms and shapes within the scope of the invention herein disclosed. For example, the sleeve-deforming spring 13 of FIG. 1 can be permanently attached to either the stem portion 11 or the handle portion 12. Also, in lieu of the rubber or plastic collar 19 of the detachable member 18, a metal collar can be used, with a screw clamp to anchor it which also defines the sleeve-deforming element. The invention should not, therefore, be regarded as limited except as defined in the following claims.

What is claimed is:

1. A dental mirror assembly for use in combination with an expendable, radially-deformable, elongated demisting sleeve fitted over the handle of the mirror to engage the mirror surface, the mirror assembly comprising a mirror head portion and a handle including a narrow support stem extending upwardly from the edge of the mirror head portion at an angle and a relatively wider finger-gripping portion secured to the upper end of the stem portion in substantial alignment therewith, the expendable demisting sleeve being slipped coaxially over the relatively wider portion of the handle and slid downwardly to surround the narrow stem to endwise engage the plane of the mirror surface, and a sleeve-deforming member carried by the handle and projecting radially outwardly therefrom in the direction of the optical axis of the mirror for a distance exceeding the maximum radius of the finger-gripping portion to distort the sleeve into an oval configuration, thereby to secure the sleeve in position against movement and to establish the lower end of the sleeve in a position at least partially overlying the mirror surface.

2. Apparatus as set forth in claim 1, said sleeve-deforming member comprising a convexly curved spring finger.

3. Apparatus as set forth in claim 1, said sleeve-deforming member comprising an offset portion on said stem.

4. Apparatus as set forth in claim 1, said sleeve-deforming member comprising a detachable collar portion adapted to surround the stem in tight frictional engagement therewith, said sleeve-deforming member projecting radially from the collar portion.

5. Apparatus as set forth in claim 1, said handle and stem being adapted to be detachably secured end to end, said sleeve-deforming member being adapted to be releasably clamped between opposed surfaces of the handle and stem.

6. Apparatus as set forth in claim 4, said collar and sleeve-deforming member being formed of resilient material.

* * * * *